United States Patent

[11] 3,599,692

[72] Inventor Horace D. Holmes, Birmingham, Mich.
[21] Appl. No. 832,611
[22] Filed June 12, 1969
[45] Patented Aug. 17, 1971
[73] Assignee Masco Corporation, Taylor, Mich.

[54] LOCK NUT ASSEMBLY AND METHOD OF MAKING THE SAME
6 Claims, 16 Drawing Figs.

[52] U.S. Cl. ............................................. 151/2 R;
29/517; 151/21 C
[51] Int. Cl. ............................................... F16b 39/02
[50] Field of Search.................................... 151/2,
2 A, 21 C, 22, 30; 85/7, 46; 29/517

References Cited

UNITED STATES PATENTS

| 78,899 | 6/1868 | Smith..................... | 151/21 C |
| 930,450 | 8/1909 | Zinow..................... | 151/2 A |
| 3,163,196 | 12/1964 | Hanneman.............. | 85/46 |
| 3,249,142 | 5/1966 | Phipard................... | 85/46 |
| 3,258,797 | 7/1966 | Budd...................... | 85/46 |
| 3,385,340 | 5/1968 | Evans..................... | 151/22 |
| 3,421,562 | 1/1969 | Orloff et al.............. | 151/2 |
| 3,464,472 | 9/1969 | Reynolds................ | 151/2 |
| 3,479,714 | 11/1969 | Allsop.................... | 151/21 C |

FOREIGN PATENTS

| 514,470 | 12/1930 | Germany................ | 151/2 A |

Primary Examiner—Marion Parsons, Jr.
Attorneys—Whittemore, Hulbert & Belknap

ABSTRACT: A lock nut assembly and method of making the same in which a non-circular bolt shank or other fastener body is provided with rolled threads of uniform depth around its entire circumference and a standard nut having a circular threaded aperture is threaded onto the bolt and then deformed radially inwardly to effect complete engagement of the threads of the nut with the threads of the bolt around the entire circumference of the bolt. The nut may be removed from the bolt with the use of a power tool and then reapplied to the bolt in the same manner.

PATENTED AUG 17 1971 3,599,692

INVENTOR.
HORACE D. HOLMES
BY Whittemore,
Hulbert & Belknap
ATTORNEYS

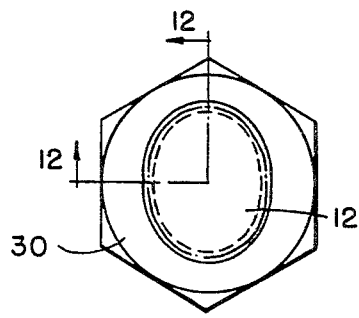
FIG.11
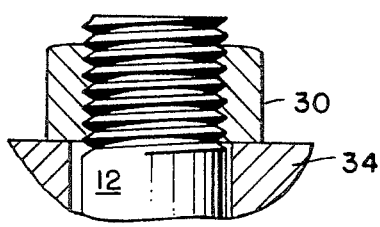
FIG.12
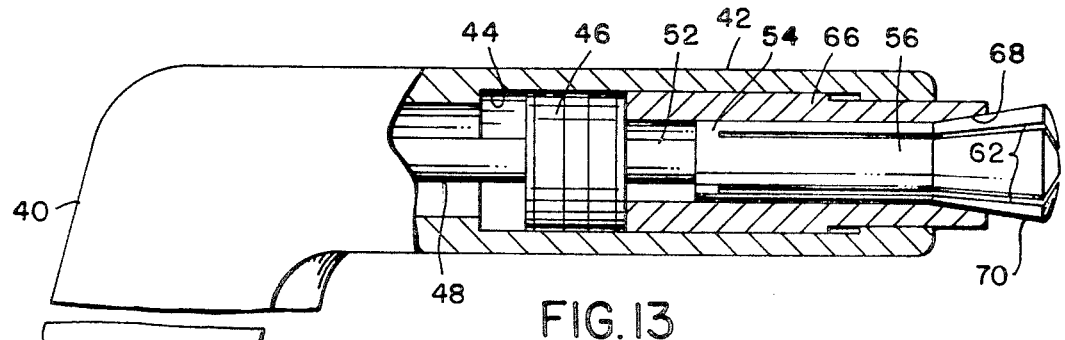
FIG.13
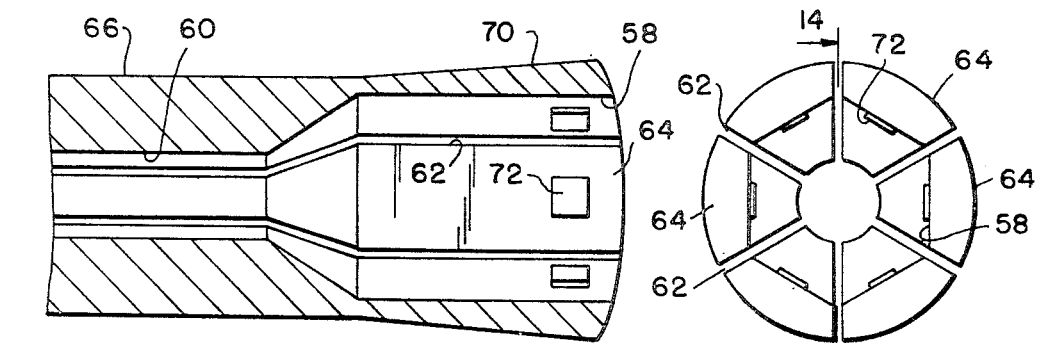
FIG.14
FIG.15
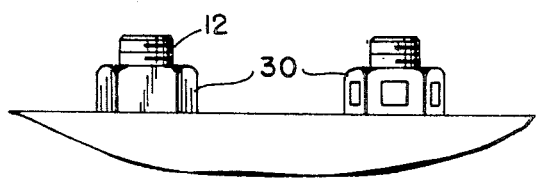
FIG.16
INVENTOR.
HORACE D. HOLMES

LOCK NUT ASSEMBLY AND METHOD OF MAKING THE SAME

Lock nut systems in commercial use require the provision of a specially made nut or bolt or both, or a separate locking element. The present invention is directed to the provision of a lock nut assembly consisting of a bolt and a standard nut, without the use of a lock washer or other similar locking element, which is capable of being disassembled and reassembled many times without any decrease in the efficiency or performance of the assembly. According to the invention, a bolt or other fastening member of non-circular cross section is provided with standard threads of uniform depth around its entire circumference, preferably by rolling threads on the bolt shank, and a standard nut having a circular threaded aperture is then threaded onto the bolt with the threads of the nut in full engagement with the threads of the bolt across the larger cross sectional dimensions of the bolt and in partial engagement across the smaller cross sectional dimensions of the bolt. After the nut is run down to the required torque the nut is squeezed or deformed radially inwardly to cause the threads thereof to flow into full engagement with the threads of the bolt around the entire circumference of the bolt, thus greatly increasing the removal torque of the assembly. With this construction it is impossible for the nut to become loosened due to vibration and other stresses in the assembly in which the nut and bolt are used. The nut can be removed from the bolt with the use of a power wrench which returns the nut aperture to its original circular configuration, and the nut can be reapplied to the bolt by the same method described above. With the lock nut assembly and method described herein there is no galling or permanent distortion of the threads of either the bolt or the nut, thus insuring that the parts may be disassembled and reassembled as often as may be required.

In the drawings:

FIG. 11 is a view similar to FIG. 9 showing the assembly after the nut has been deformed to provide full engagement between the threads of the nut and the bolt;

FIG. 12 is a sectional view taken on line 12—12 of FIG. 11;

FIG. 13 is a fragmentary sectional view of a power tool which may be used to apply the nut to the bolt;

FIG. 14 is an enlarged fragmentary sectional view of a portion of the collet used in the apparatus of FIG. 13;

FIG. 15 is an end elevational view of the collet; and

FIG. 16 is an elevational view illustrating the lock nut assembly before and after the application of pressure to deform the nut into engagement with the bolt.

Figure 1:
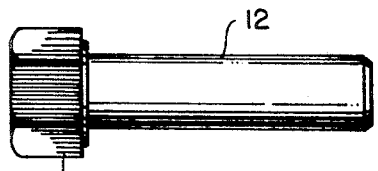
FIG. 1 is an elevational view of a bolt blank having a non-circular shank suitable for use in this invention.
Figure 2:
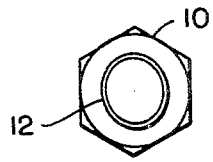
FIG. 2 is an end elevational view of the bolt blank of FIG. 1, illustrating a bolt having a shank which is elliptical in cross section.
Figure 3:
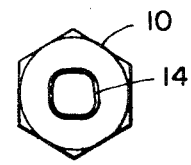
FIG. 3 illustrates a modified form of bolt in which the shank is square in cross section with the corners thereof provided with a suitable radius.

A male fastening element, such as a bolt, is formed from a bolt blank illustrated in FIG. 1. The blank consists of a hexagonal or other shaped head 10 and a shank portion 12 which is non-circular and preferably of elliptical cross section as shown in FIG. 2. The blank may be made by cold heading or any other suitable manner. The blank may also have a shank 14 of square cross section as shown in FIG. 3, and in fact the shank may be provided with any even number of sides, with the elliptical configuration shown in FIG. 2 being considered as a two-sided blank in the sense that the radial extent of two diametrically opposed portions is less than the largest diameter of the shank.

Figure 4:
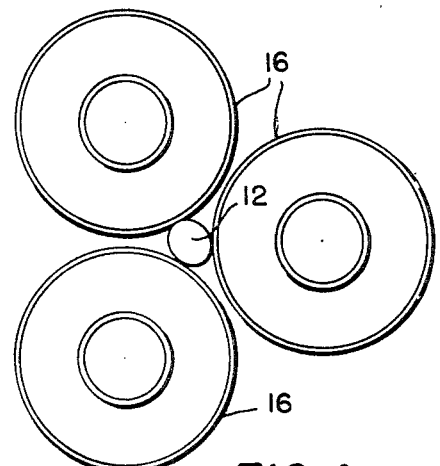
FIG. 4 is a schematic illustration of a portion of a thread rolling apparatus which may be employed to roll threads of uniform depth on a non-circular bolt or other fastening element.
Figure 5:
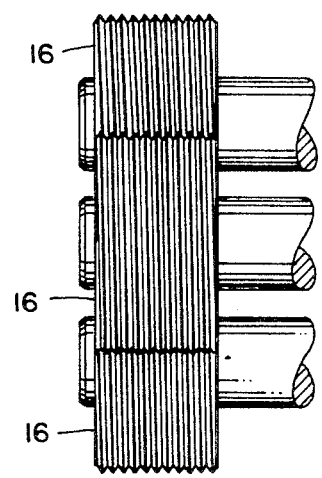
FIG. 5 is a side elevational view of the thread rolling dies shown in FIG. 4.

It has been found that threads of uniform diameter throughout the circumferential extent of the bolt may be formed thereon by rolling the threads in a conventional 3-die thread rolling apparatus which is illustrated schematically in FIGS. 4 and 5. In a thread rolling machine of this type the elliptical bolt shank 12 will not rotate on its axis, but the axis thereof will describe a path which will roll threads of uniform depth entirely around the bolt. This result can be achieved with a blank having any even number of sides. The threads rolled on the blank by the thread rolling dies 16 will be standard threads in that the relationships between the root diameter, the pitch diameter, and the major diameter will be the same as would be obtained if the same dies were used to roll threads on a circular blank. The threads may be formed in any other manner if desired.

Figure 6:
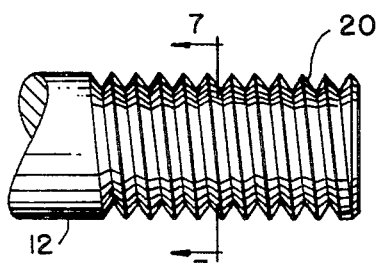
FIG. 6 is a fragmentary elevational view of a bolt provided with threads according to this invention.
Figure 7:
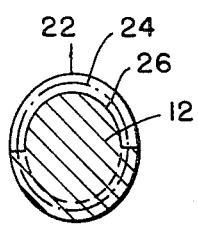
FIG. 7 is a sectional view taken on line 7—7 of FIG. 6.
Figure 8:
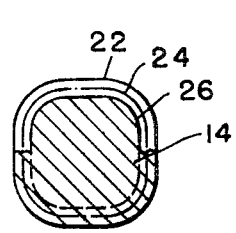
FIG. 8 is a sectional view similar to FIG. 7 of a bolt having a square cross section.

FIG. 6 illustrates the elliptical shank portion 12 of the bolt after the threads 20 have been rolled thereon. In FIG. 7 the major diameter, the pitch diameter, and the root diameter are, respectively, indicated by the reference characters 22, 24 and 26. Across the largest cross sectional dimension of the threaded shank these diameters are the same as those of conventional threads for a circular bolt of given size, and across the minor axis of the elliptical shank such dimensions are reduced by a few thousandths of an inch, for example 0.005 inch or more, although the depth of the thread remains substantially uniform around the entire circumference of the bolt. In the case of a square shank shown in FIG. 8, or a shank having any other even number of sides, the dimensions across the flats are a few thousandths of an inch less than across the corners, but the threads are of substantially uniform depth throughout.

Figure 9:
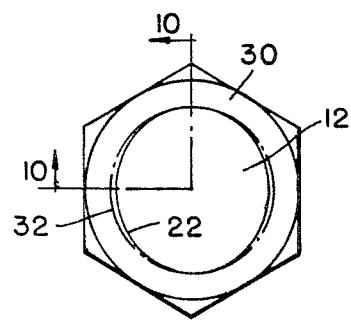
FIG. 9 is an end elevational view showing a standard nut threaded onto an elliptical bolt.
Figure 10:
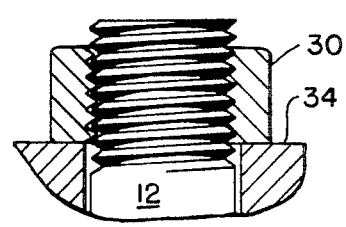
FIG. 10 is a sectional view taken on line 10—10 of FIG. 9, showing the engagement of the threads prior to squeezing of the nut onto the bolt.

A nut 30, which may be a standard hexagonal nut having a circular threaded aperture, the threads of which are the same as those on the bolt, is adapted to be threaded onto the bolt as shown in FIG. 9. In FIG. 9 the reference character 32 indicates the root diameter of the threads formed in the nut 30, and from FIG. 10 it will be seen that when the nut 30 is threaded onto the bolt 12 to engage a part 34 adapted to be secured by the nut and bolt assembly, the threads of the nut and bolt across the largest dimension of the bolt are in full engagement while the threads across the smallest dimension or minor axis of the bolt are in partial engagement only, due to the few thousandths of an inch differential between the major and minor axes of the bolt.

FIGS. 11 and 12 illustrate the assembly after the nut has been deformed radially inwardly to cause complete engagement of the threads of the nut with the threads of the bolt around the entire periphery of the bolt. The squeezing of the nut to effect this engagement of the threads may be accomplished in any number of ways, one of which is illustrated in FIGS. 13–15. FIG. 13 illustrates a power tool of the gun type which may include a handle portion 40 and a cylindrical portion 42 defining a cylinder 44 containing a piston 46 reciprocable therein and mounted on a drive shaft 48 which at its left-hand end is adapted to be coupled to a suitable power source supplied through the conduit 50 connected to the handle portion 40 so that the shaft 48 may be rotated when desired. The outer end 52 of the shaft is secured to the inner end 54 of a split collet 56. The collet 56 has a hexagonal socket 58 opening from its outer end and a communicating smaller diameter bore 60. A series of slots 62 are provided throughout the major portion of the length of the collet to define individual spring segments 64. Each of the slots 62 is preferably disposed at one of the corners of the hexagonal socket 58 in the collet. A sleeve 66 is slidably mounted within the cylinder 44 of the power tool and has a tapered portion 68 at its outer end engageable with a correspondingly tapered surface 70 on the collet 56.

The power tool shown in FIG. 13 may be utilized to run the nut down on the bolt to the required torque by rotation of the shaft 48 with the nut confined within the socket 58 in the collet 56. Power wrenches of this type are well known, and the device illustrated in FIG. 13 may be considered merely illustrative of one type of power tool that may be suitable for this purpose. After the nut is tightened to the required extent, fluid pressure may be supplied through the conduit 50 into the left-hand end of cylinder 44 against piston 46 to force the latter and the sleeve 66 outwardly to contract the segments 64 of the collet against the side surfaces of the nut. Each face of the socket 58 in the collet may be provided with a raised pad 72 of square or other shape so that the collapsing of the collet will effect the application of pressure of metal deforming intensity against the sides of the nut to deform the same radially inwardly to obtain full engagement of the threads of the nut with the threads of the bolt throughout the circumferential extent of the bolt. It will be apparent that upon the application of pressure in the manner described, those of the segments 64 which engage the portions of the bolt lying on or closely adjacent its major axis will not be deflected to as great an extent as the remaining segments, or in any event will not cause the metal of the nut in the area of the fully engaged threads to flow, but rather will aid in effecting a flow of the metal of the nut toward the areas thereof opposite the minor dimensions of the bolt, thereby to effect full engagement of the threads entirely around the bolt.

FIG. 16 illustrates an assembly of parts adapted to utilize two or more of the lock nut assemblies of this invention and in the left-hand portion shows a bolt 12 having a nut 30 threaded thereon prior to deformation of the nut, and in the right-hand portion illustrates a nut 30 after the same has been deformed into full engagement with the bolt. The lock nut assembly described herein may be carried out by separate tools to tighten the nut to obtain the required torque and to effect the distortion necessary to lock the nut onto the bolt, rather than by a single tool as disclosed herein. In either event, the lock nut assembly is well adapted for use in the mass production assembly of parts, or to individual application as may be required. It is also contemplated that the nut initially may be run down finger tight and the final clamping force applied during the operation of squeezing the nut to provide full engagement of the threads.

A bolt shank having three sides or any odd number of sides may also be utilized in practising the invention, although the forming of the threads thereon may be carried out by other appropriate thread rolling or other conventional techniques.

The lock nut of this invention has the advantage of utilizing a conventional standard nut and a bolt which may be produced very inexpensively by conventional mass production techniques to substantially reduce the cost of the parts as compared with commercially available lock nut constructions, and provides an assembly having very high removal torque to prevent any possibility of accidental removal or loosening of the nut.

What I claim as my invention is:

1. The method of making a removable and reusable lock nut assembly which comprises: providing an externally threaded fastener body of non-circular cross section which is only slightly out of round and smoothly and gradually curved around its entire circumference and having uniform threads of substantially uniform depth around the entire circumference and throughout the entire threaded length thereof. threading a standard nut having a circular threaded aperture onto said body to fully engage the threads at spaced points around the circumference of said body and to only partially engage the remainder of the threads, and then applying pressure of metal deforming intensity to the sides of the nut sufficient to cause substantially complete engagement of the threads of the nut with the body around the entire circumference of the body.

2. The method of making a removable and reusable lock nut assembly which comprises: forming a bolt blank having a shank portion of non-circular cross section which is only slightly out of round and smoothly and gradually curved around its entire circumference, and forming uniform threads on said bolt shank to a uniform depth around the entire circumference and along the entire threaded length of said shank, threading a standard nut having a circular threaded aperture onto said bolt to fully engage the threads at spaced points around the circumference of the bolt and to only partially engage the remainder of the threads, and then applying pressure of metal deforming intensity to the sides of the nut sufficient to cause substantially complete engagement of the threads of the nut with the bolt around the entire circumference of the bolt.

3. The method of making a removable and reusable lock nut assembly which comprises: forming a bolt blank having a shank portion of non-circular cross section which is only slightly out of round and smoothly and gradually curved around its entire circumference and which is symmetrical about at least two perpendicular planes, rolling threads on said bolt shank to a uniform depth around the entire circumference and along the entire length of the threaded portion of said shank, providing a standard nut having a circular threaded aperture, threading said nut onto said bolt to fully engage the threads at the major diameters across the bolt and to only partially engage the threads across the minor diameters thereof, and then applying pressure of metal deforming intensity to the sides of the nut sufficient to cause substantially complete engagement of the threads of the nut with the threads of the bolt around the entire circumference of the bolt.

4. A removable and reusable lock nut assembly comprising the combination of a bolt having a shank of non-circular cross section which is only slightly out of round and smoothly and gradually curved around its entire circumference and provided with standard threads of uniform depth around its entire circumference and along its entire threaded length, and a standard nut having an initially circular threaded aperture threaded onto said bolt and deformed radially inwardly to cause substantially complete engagement of the threads of the nut with the threads of the bolt around the entire circumference of the bolt.

5. An assembly according to claim 4 in which said bolt shank is symmetrical in cross section about at least two perpendicular planes.

6. An assembly according to claim 5 wherein said nut is deformed at at least two circumferentially spaced points.